(12) United States Patent
Wu et al.

(10) Patent No.: US 8,725,201 B2
(45) Date of Patent: May 13, 2014

(54) MULTI-CARRIER RECEIVING DEVICE AND METHOD

(71) Applicant: Huawei Technologies Co., Ltd., Guangdong (CN)

(72) Inventors: Gengshi Wu, Shanghai (CN); Meng Hua, Shanghai (CN); Shurong Jiao, Shanghai (CN); Xiaolei Tie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/848,522

(22) Filed: Mar. 21, 2013

(65) Prior Publication Data

US 2013/0287152 A1 Oct. 31, 2013

(30) Foreign Application Priority Data

Mar. 21, 2012 (CN) .......................... 2012 1 0075793

(51) Int. Cl.
*H04B 1/04* (2006.01)
(52) U.S. Cl.
USPC ...................................... 455/552.1; 455/314
(58) Field of Classification Search
USPC ............... 455/45, 67.11, 550.1, 552.1, 575.1, 455/130, 131, 132, 177.1, 179.1, 180.1, 455/182.1, 313, 314, 315, 317, 323; 375/219, 222, 316, 344
See application file for complete search history.

(56) References Cited

U.S. PATENT DOCUMENTS

| | | | |
|---|---|---|---|
| 7,991,368 B2 * | 8/2011 | Rubin et al. .................. | 455/317 |
| 2005/0003853 A1 * | 1/2005 | Burgt .......................... | 455/552.1 |
| 2006/0046672 A1 * | 3/2006 | Kalhan et al. ............. | 455/177.1 |
| 2011/0134972 A1 * | 6/2011 | Zhu et al. ...................... | 375/219 |

* cited by examiner

*Primary Examiner* — Thanh Le

(57) ABSTRACT

The present invention discloses a multi-carrier receiving device and method. The multi-carrier receiving device includes an antenna, a splitter, a plurality of analog extraction modules, a combiner, an analog-to-digital converter, and a plurality of digital extraction modules, where input ends of the plurality of analog extraction modules are connected to an output end of the splitter; an input end of the combiner is connected to output ends of the plurality of analog extraction modules, and an output end of the combiner is connected to an input end of the analog-to-digital converter; an output end of the analog-to-digital converter is connected to each of the plurality of digital extraction modules; and the plurality of digital extraction modules extracts a single-carrier digital signal from a digital signal obtained after analog-to-digital conversion.

11 Claims, 6 Drawing Sheets

MULTI-CARRIER RECEIVING DEVICE AND METHOD

CROSS-REFERENCE TO RELATED APPLICATION

This application claims priority to Chinese Patent Application No. 201210075793.4, filed on Mar. 21, 2012, which is hereby incorporated by reference in its entirety.

FIELD OF THE INVENTION

The present invention relates to the field of communications technologies, and in particular, to a multi-carrier receiving device and method.

BACKGROUND OF THE INVENTION

In wireless communication technologies, DC-HSDPA (Dual-Cell HSDPA, dual-cell high speed downlink packet access) is a carrier method launched by 3GPP (The 3rd Generation Partnership Project, the 3rd generation partnership project) in 2008. An existing single-carrier receiving device is shown in FIG. 1, where 1 is an antenna, 2 is a down-converter, 3 is a 5M analog-domain low-pass filter, and 4 is a 5M digital-to-analog converter, and therefore, in data transmission, downlink bandwidth can be increased by utilizing more carrier resources, so as to obtain a higher data transfer rate.

The DC-HSDPA means that two adjacent carriers use the same band to transmit downlink data. In the data transmission, data transmission has to be performed in the DC-HSDPA by using the same band, so if a band is idle and cannot be made full use of, the rate of data transfer is lowered. To further take full advantage of a carrier of the idle band, the 3GPP launched DB-DC-HSDPA (Dual-Band Dual-Cell HSDPA, dual-band dual-cell high speed downlink packet access) in 2009. The DB-DC-HSDPA utilizes the idle band to expand the DC-HSDPA from two continuous carriers of the same band to two carriers of two different bands. As shown in FIG. 2, 5 is a splitter, and after being received by an antenna, a signal is divided into two paths through the splitter and each carrier has an independent receiving chain. In addition, although such a dual-carrier receiver mechanism can be further extended into more carriers directly, each carrier has an independent receiving chain likewise.

In the existing DB-DC-HSDPA, a carrier of each band has an independent receiving chain, so the receiving of a carrier signal of each band needs one independent analog-to-digital converter, that is, a plurality of analog-to-digital converters needs to be arranged in one receiving device, and when the plurality of analog-to-digital converters works at the same time, power consumption of the receiving device is high.

SUMMARY OF THE INVENTION

In view of the above, embodiments of the present invention provide a multi-carrier receiving device and method, where only one analog-to-digital converter is required in multi-carrier data transmission, thereby decreasing power consumption of the receiving device so as to solve a problem of high power consumption of an existing multi-carrier receiving device.

To achieve the objective above, technical solutions provided by the embodiments of the present invention are as follows:

A multi-carrier receiving device includes an antenna, a splitting module, a combiner, an analog-to-digital converter, M analog extraction modules, and N digital extraction modules, where M is an integer larger than 2, and N is an integer larger than or equal to M.

The antenna is configured to receive a multi-carrier signal, where the multi-carrier signal includes N single-carrier signals.

The splitting module is configured to split the multi-carrier signal into a plurality of band signals in accordance with different bands, where any one of the band signals includes one single-carrier signal, or a plurality of discrete single-carrier signals, or a plurality of continuous single-carrier signals, and the number of the plurality of band signals is less than or equal to M.

The M analog extraction modules are configured to perform frequency conversion and analog filtering on the plurality of band signals to obtain L intermediate signals, where one band signal corresponds to at least one analog extraction module, bands of the L intermediate signals are different and continuous, and $M \leq L \leq N$.

The combiner is configured to combine the L intermediate signals into one analog signal in accordance with a manner of adding bandwidth together.

The analog-to-digital converter is configured to perform analog-to-digital conversion on the analog signal obtained after the combination to obtain one digital signal.

The N digital extraction modules are configured to extract N single-carrier digital signals which are in one-to-one correspondence with the N single-carrier signals included in the multi-carrier signal from the digital signal.

A multi-carrier receiving method includes:

receiving a multi-carrier signal, where the multi-carrier signal includes N single-carrier signals;

splitting the received multi-carrier signal into a plurality of band signals in accordance with different bands, where any one of the band signals includes one single-carrier signal, or a plurality of discrete single-carrier signals, or a plurality of continuous single-carrier signals; performing frequency conversion and analog filtering on the plurality of band signals to obtain L intermediate signals, where bands of the L intermediate signals are different and continuous, and L is less than or equal to N;

combining the L intermediate signals in accordance with a manner of adding bandwidth together to obtain one analog signal with continuous bands;

performing analog-to-digital conversion on the analog signal obtained after the combination to obtain one digital signal; and performing frequency conversion and digital filtering on the digital signal to obtain N single-carrier digital signals which are in one-to-one correspondence with the N single-carrier signals included in the multi-carrier signal.

It can be seen from the technical solutions above, in the multi-carrier receiving device provided by an embodiment of the present invention, only one analog-to-digital converter needs to be arranged when a multi-carrier signal is received. Compared with the prior art, the number of analog-to-digital converters arranged in the receiving device is decreased, thereby decreasing power consumption of the receiving device.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. Apparently, the accompanying drawings in the following

DETAILED DESCRIPTION OF THE EMBODIMENTS

In an existing multi-carrier receiving device, such as a DB-DC-HSDPA receiving device, and an MB-MC-HSDPA (Multi-Band Multi-Cell HSDPA, multi-band multi-cell) receiving device, each carrier has an independent receiving chain, so receiving of each carrier needs to be completed by one independent analog-to-digital converter, that is, a plurality of analog-to-digital converters needs to be arranged in one receiving device. In this way, when the receiving device receives multi-carrier data, the plurality of analog-to-digital converters needs to work at the same time, leading to the increase in power consumption of the receiving device, and therefore the multi-carrier receiving device needs to be improved urgently.

Accordingly, an embodiment of the present invention provides a multi-carrier receiving device, including an antenna, a splitting module, M analog extraction modules, a combiner, an analog-to-digital converter, and N digital extraction modules. After a multi-carrier signal including N single-carriers is received, the splitting module splits the multi-carrier into a plurality of intermediate signals, the M analog extraction modules extract one single-carrier signal or a plurality of continuous single-carrier signals from the plurality of intermediate signals; and then, the L intermediate signals extracted by the M analog extraction modules are combined, analog-to-digital conversion is performed on the signal obtained after the combination by using one analog-to-digital converter, and then L single-carrier digital signals are extracted from the digital signal, which is obtained after the analog-to-digital conversion, by using L digital extraction modules. Therefore, the multi-carrier receiving device provided by the embodiment of the present invention is capable of completing the receiving of the multi-carrier signal by using one analog-to-digital converter, thereby decreasing the cost of hardware, and decreasing the power consumption of a receiving end.

To make persons skilled in the art better understand the solutions of the present invention, the technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
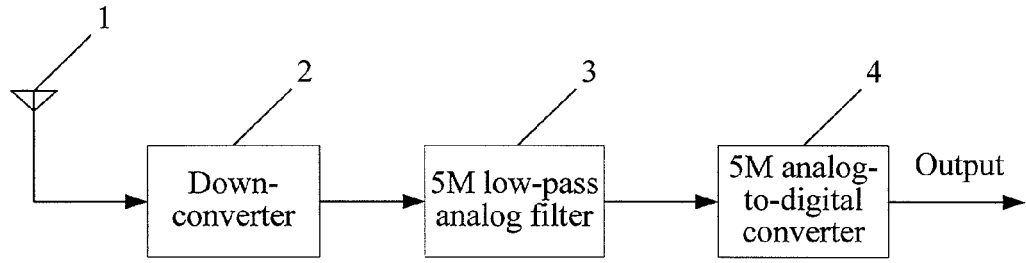
FIG. 1 is an existing single-carrier receiver device.
Figure 2:
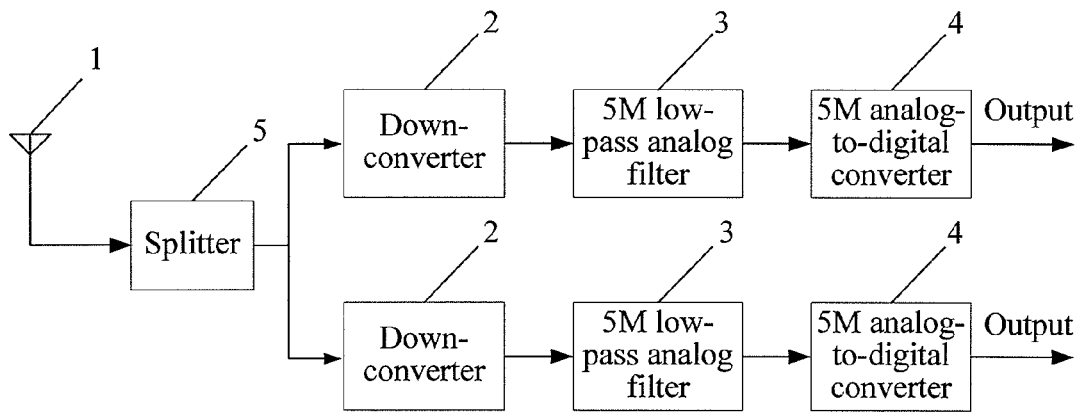
FIG. 2 is an existing dual-carrier receiver device.
Figure 3:
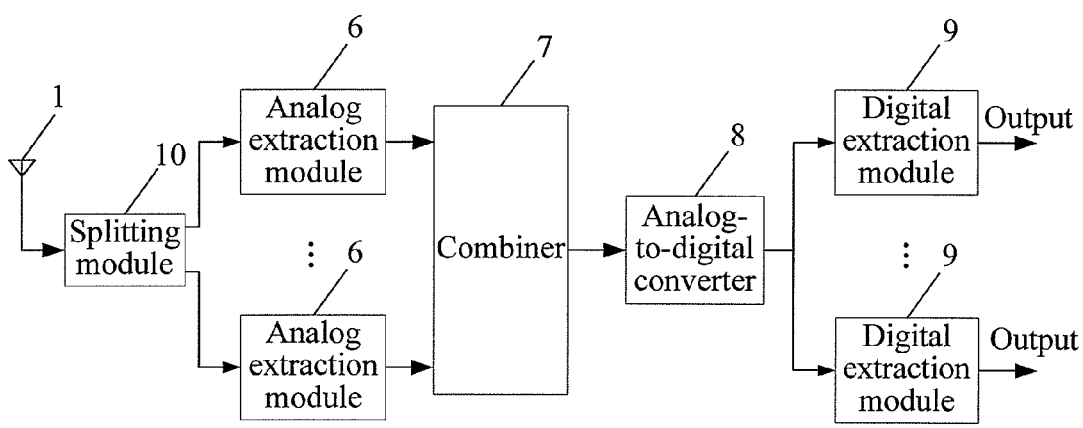
FIG. 3 is a schematic structural diagram of a multi-carrier receiving device provided by an embodiment of the present invention.

FIG. 3 is a schematic structural diagram of a multi-carrier receiving device provided by an embodiment of the present invention.

As shown in FIG. 3, the multi-carrier receiving device includes an antenna 1, a splitting module 10, M analog extraction modules 6, a combiner 7, an analog-to-digital converter 8, and L digital extraction modules 9.

The antenna 1 is configured to receive a multi-carrier signal. A plurality of band signals is included in the received multi-carrier signal, and each band signal includes at least one single-carrier signal. In the embodiment of the present invention, a solution of the present invention is described by taking a case where the received multi-carrier signal has N single-carrier signals as an example.

The splitting module 10 is configured to split the received multi-carrier signal into a plurality of band signals whose center frequency points are located at a zero frequency in accordance with different bands. The band signal obtained after the splitting may include at least one type of the following three types of signals: single-carrier signals in one band, a plurality of discontinuous single-carrier signals, or a plurality of continuous single-carrier signals. In the embodiment of the present invention, the number of band signals obtained after the splitting performed by the splitting module 10 is less than or equal to M, where N and M are all positive integers.

The M analog extraction modules 6 are configured to perform frequency conversion and filtering on the plurality of band signals to obtain L intermediate signals. One of the band signals can correspond to at least one analog extraction module 6, and the bands of the obtained L intermediate signals are different and continuous. Each intermediate signal can include one single-carrier signal and can also include a plurality of continuous single-carrier signals, so L is larger than or equal to M and is less than or equal to N, and L is also a positive integer.

The combiner 7 is configured to combine the L intermediate signals into one analog signal with continuous bands in accordance with a manner of adding bandwidth together. Because the bands of the L intermediate signals are different and continuous, the analog signal obtained after the combination includes all of the N single-carrier signals.

The analog-to-digital converter 8 is configured to perform analog-to-digital conversion on the analog signal with continuous bands that is obtained after the combination to obtain one digital signal.

The N digital extraction modules 9 each are configured to extract one of N single-carrier digital signals from the digital signal. The N single-carrier digital signals herein are in one-to-one correspondence with the N single-carrier signals included in the multi-carrier signal received by the antenna.

Compared with the prior art, only one analog-to-digital converter is arranged in the multi-carrier receiving device provided by the embodiment of the present invention, so the number of analog-to-digital converters arranged in the multi-carrier receiving device is decreased; in this way, power consumption of the multi-carrier receiving device may be decreased when the multi-carrier signal is received.

Embodiment 2

The present invention is described in further detail by taking a dual-carrier as an example. In the embodiment of the present invention, a dual-carrier signal received by an antenna 1 has two 5M single-carrier signals.

Figure 4:
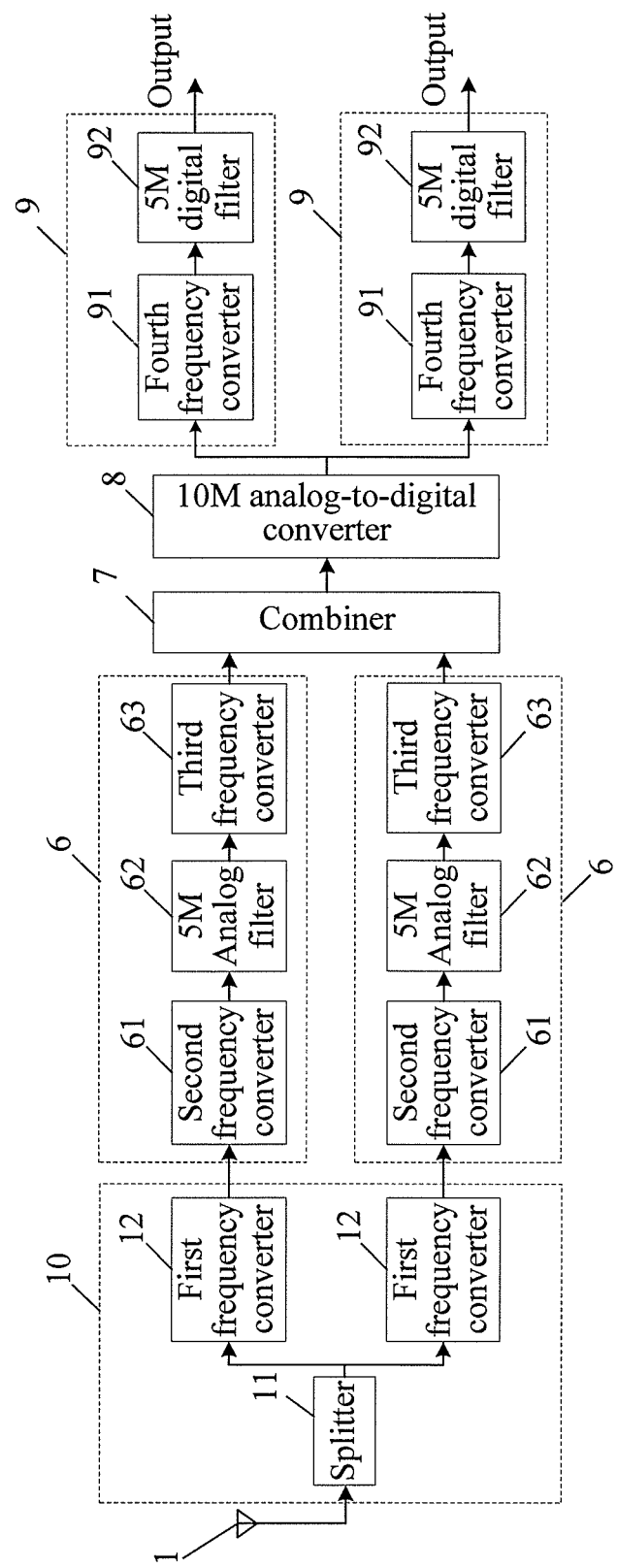
FIG. 4 is a schematic structural diagram of a specific implementation manner of a dual-carrier receiving device provided by an embodiment of the present invention.

FIG. 4 is a schematic structural diagram of a specific implementation manner of a dual-carrier receiving device provided by an embodiment of the present invention.

As shown in FIG. 4, in the embodiment of the present invention, a splitting module 10 includes a splitter 11 and two first frequency converters 12.

The splitter 11 is configured to split the dual-carrier signal received by the antenna 1 into a plurality of split signals in accordance with different bands, where the number of split signals is less than or equal to M which is the number of analog extraction modules 6. The first frequency converters 12 each is configured to perform frequency conversion on the plurality of split signals and shift the center frequency points of the plurality of split signals to a zero frequency to obtain a plurality of band signals whose center frequency points are located at the zero frequency.

In the embodiment of the present invention, the number of split signals is two, the number of band signals obtained after the splitting performed by the splitting module 10 is two, and each band signal has one single-carrier signal.

Moreover, as shown in FIG. 4, in the embodiment of the present invention, the number of analog extraction modules 6 is two, and each analog extraction module 6 includes a second frequency converter 61, a 5M analog filter 62, and a third frequency converter 63.

The second frequency converter 61 is connected to one first frequency converter 12, and is configured to shift the center frequency point of one single-carrier signal in the band signal to the zero frequency, so that the single-carrier signal is filtered out.

The 5M analog filter 62 is configured to perform analog filtering on the band signal, where the center frequency point of the single-carrier signal of the band signal is shifted to the zero frequency, and filter out one single-carrier signal of the band signal.

The third frequency converter 63 is configured to shift the center frequency point of the one single-carrier signal, which is filtered out, to obtain one intermediate signal. The third frequency converter 63 performs frequency shift on the single-carrier signal with the objective that bands of two intermediate signals obtained by the two analog extraction modules 6 can be different and continuous, which is convenient for a subsequent combination progress.

The analog signal obtained after the combination includes two single-carrier signals, so bandwidth of an analog-to-digital converter 8 needs to be larger than or equal to the sum of bandwidth of 5M analog filters 62 in the two analog extraction modules 6.

In addition, as shown in FIG. 4, in the embodiment of the present invention, the number of digital extraction modules 9 is two and is the same as the number of single-carriers in the dual-carrier received by the antenna 1, and the digital extraction module 9 includes: a fourth frequency converter 91 and a 5M digital filter 92.

The fourth frequency converter 91 is configured to perform the frequency conversion on the digital signal obtained after the analog-to-digital conversion, and shift the center frequency point of one single-carrier signal in the digital signal to the zero frequency.

The 5M digital filter 92 is configured to filter out the single-carrier signal in the digital signal obtained after the frequency conversion to obtain one single-carrier digital signal corresponding to one single-carrier signal in the multi-carrier signal received by the antenna 1.

Embodiment 3

In the previous embodiment where the dual-carrier is taken as an example, in the digital extraction module 9, firstly frequency shift and then digital filtering are performed on the digital signal obtained after the analog-to-digital conversion. In the embodiment of the present invention, as shown in FIG. 5, firstly digital filtering and then frequency shift may be performed on the digital signal obtained after the analog-to-digital conversion.

Figure 5:
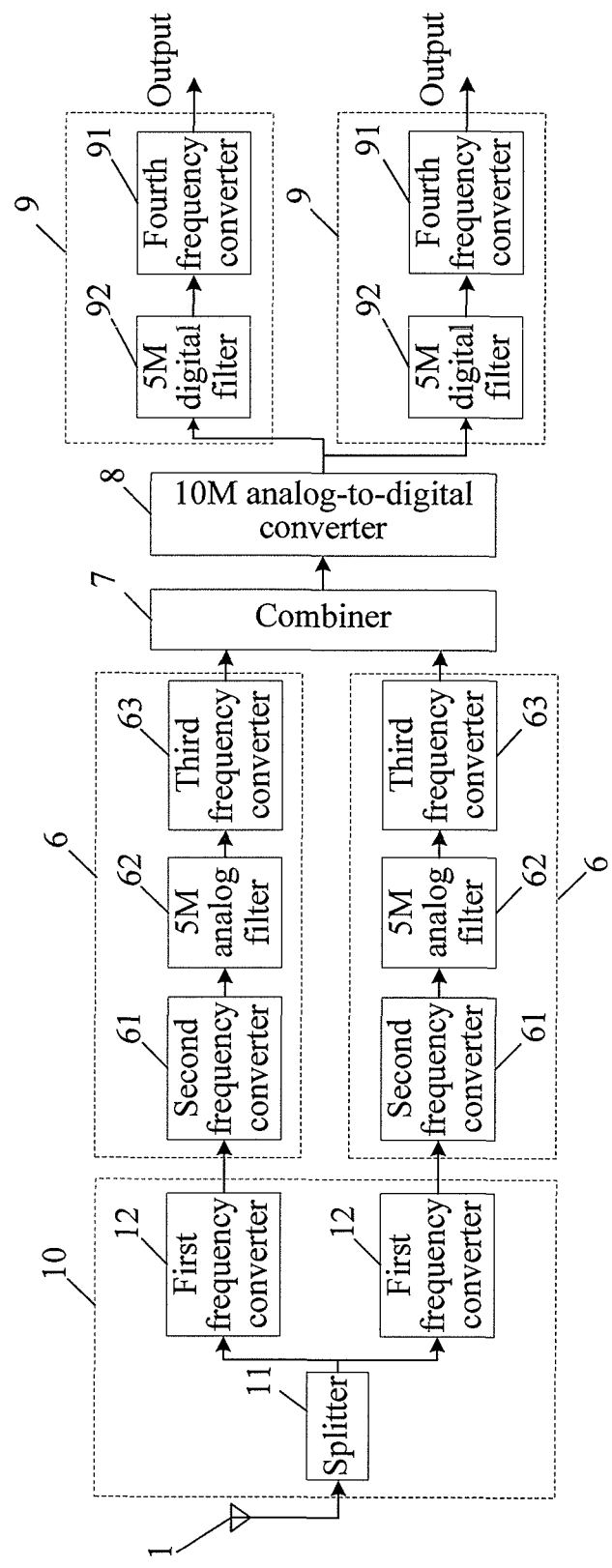
FIG. 5 is a schematic structural diagram of another specific implementation manner of a dual-carrier receiving device provided by an embodiment of the present invention.

As shown in FIG. 5, a digital filter 92 is configured to filter out one single-carrier signal in the digital signal obtained after the analog-to-digital conversion.

A fourth frequency converter 91 is configured to shift the center frequency point of the single-carrier signal filtered out to a zero frequency to obtain one single-carrier digital signal corresponding to one single-carrier signal in the multi-carrier signal received by the antenna 1.

At the time of processing the digital signal obtained after the analog-to-digital conversion, the filtering is performed firstly, and then the frequency conversion is performed on the single-carrier signal obtained after the filtering, so in the embodiment of the present invention, the center frequency point of the digital filter 92 is different from the center frequency point of the digital filter 92 in the previous embodiment.

Embodiment 4

The present invention is described in further detail by taking a four-carrier as an example. In the embodiment of the present invention, a four-carrier signal received by an antenna 1 has four 5M single-carrier signals, and two of the four 5M single-carrier, signals are continuous.

Figure 6:
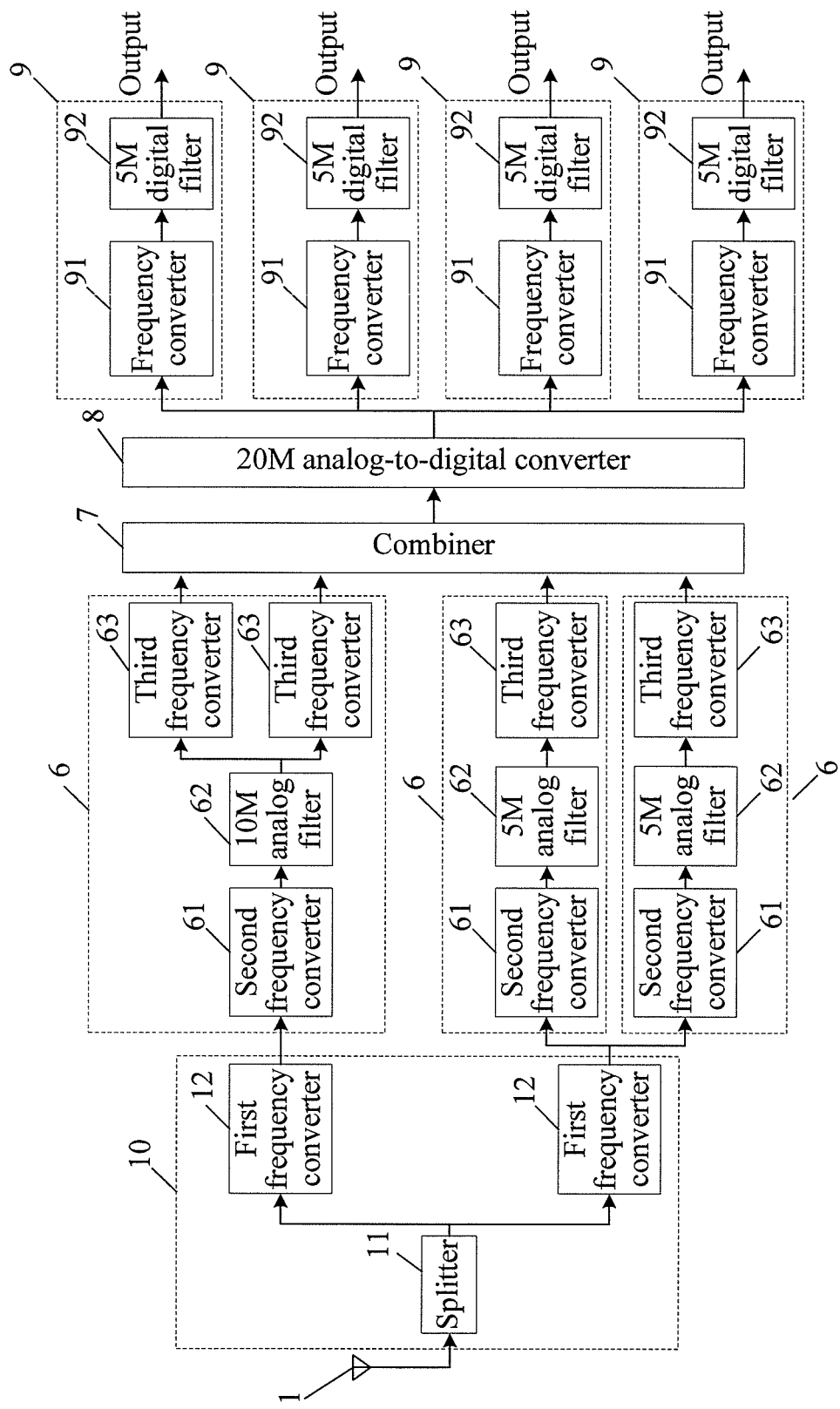
FIG. 6 is a schematic structural diagram of a specific implementation manner of a four-carrier receiving device provided by an embodiment of the present invention.

FIG. 6 is a schematic structural diagram of a specific implementation manner of a four-carrier receiving device provided by the embodiment of the present invention.

In the embodiment of the present invention, the number of first frequency converters 12 in a splitting module 10 is two, a splitter 11 splits the four-carrier signal into two split signals, where two single-carrier signals in one split signal are continuous, and frequency conversion is performed on the classification signal of the continuous single-carrier signals by a first frequency converter 12 at the top of FIG. 6.

As shown in FIG. 6, in the embodiment of the present invention, there are three analog extraction modules 6, that is, a first analog extraction module 600, a second analog extraction module 610, and a third analog extraction module 620, where the analog extraction module 6 includes a second frequency converter 61, a 10M analog filter 62, and two third frequency converters 63.

The second frequency converter 61 is configured to shift center frequency points of two continuous single-carrier signals in a band signal to a zero frequency, so that the two continuous single-carrier signals are filtered out.

The 10M analog filter 62 is configured to perform analog filtering on the band signal obtained after frequency shift performed by the second frequency converter 61, and filter out the two continuous single-carrier signals in the band signal.

The two third frequency converters 63 are configured to shift center frequency points of the two continuous single-carrier signals obtained after the filtering to obtain two intermediate signals, respectively. The third frequency converter 63 performs frequency shift on the single-carrier signals with the objective that the bands of the two intermediate signals obtained by the two analog extraction modules 6 can be different and continuous, which is convenient for a subsequent combination progress.

Structures of the second analog extraction module 610 and the third analog extraction module 620 are the same with the structure of the analog extraction module 6 in the aforementioned embodiment, and are not repeated herein.

In addition, in the embodiment of the present invention, the number of digital extraction modules 9 is four. The four digital extraction modules 9 each extract one single-carrier digital signal from the digital signal obtained after the analog-to-digital conversion, and the four single-carrier digital signals obtained through the extraction are in one-to-one correspondence with the four single-carrier signals in the four-carrier signal received by the antenna 1.

In the embodiment of the present invention, the multi-carrier receiving device provided by the present invention is described in detail by taking the four-carrier as an example. In other embodiments of the present invention, as required, an eight-carrier signal and a signal with more carriers can be received after expansion is performed on the basis of the four-carrier, and such expansion falls within the protection scope of the present invention.

Embodiment 5

Figure 7:
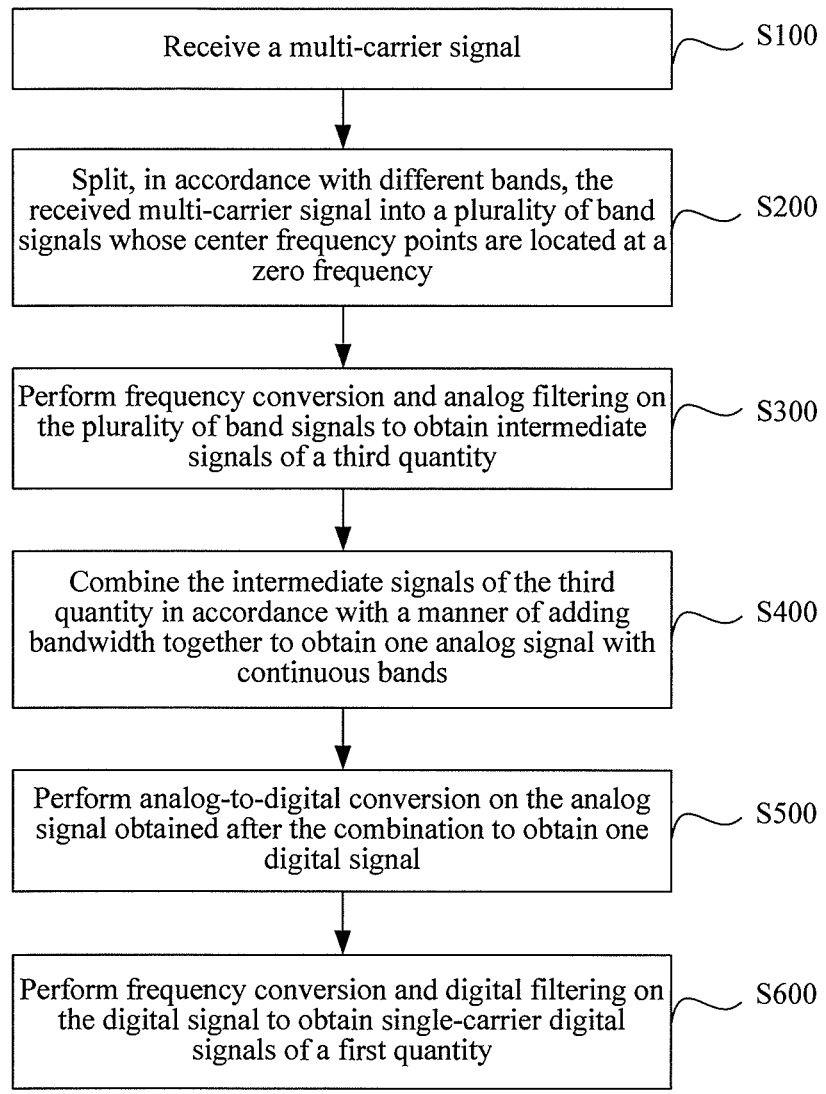
FIG. 7 is a schematic structural diagram of another specific implementation manner of a four-carrier receiving structure provided by an embodiment of the present invention.

The present invention further provides a multi-carrier receiving method. FIG. 7 is a schematic flow chart of a multi-carrier receiving method provided by the embodiment of the present invention.

The multi-carrier receiving method includes the following steps.

S100: Receive a multi-carrier signal.

The multi-carrier signal is received by using an antenna, and the multi-carrier signal includes N single-carrier signals.

S200: Split, in accordance with different bands, the received multi-carrier signal into a plurality of band signals.

In accordance with different bands, the received multi-carrier signal is split into the plurality of band signals whose center frequency points are located at a zero frequency.

Figure 8:
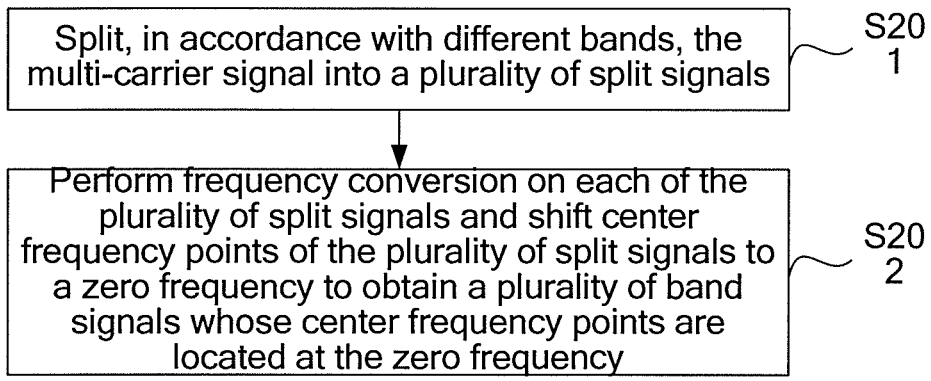
FIG. 8 is a schematic flow chart of a multi-carrier receiving method provided by an embodiment of the present invention.

In the embodiment of this application, as shown in FIG. 8, this step may include the following steps.

S201: Split, in accordance with different bands, the multi-carrier signal into a plurality of split signals.

The number of split signals herein is less than or equal to N, and a split signal may include one single-carrier signal, a plurality of continuous single-carrier signals, or a plurality of discrete single-carrier signals.

S202: Perform frequency conversion on the plurality of split signals and shift the center frequency points of the plurality of split signals to the zero frequency to obtain a plurality of band signals whose center frequency points are located at the zero frequency.

The center frequency points of different split signals obtained after the splitting are usually not located at the zero frequency, so for the convenience of looking for a single-carrier signal in a split signal, the center frequency point of the split signal herein can be shifted to the zero frequency.

S300: Perform frequency conversion and analog filtering on the plurality of band signals to obtain L intermediate signals.

Figure 9:
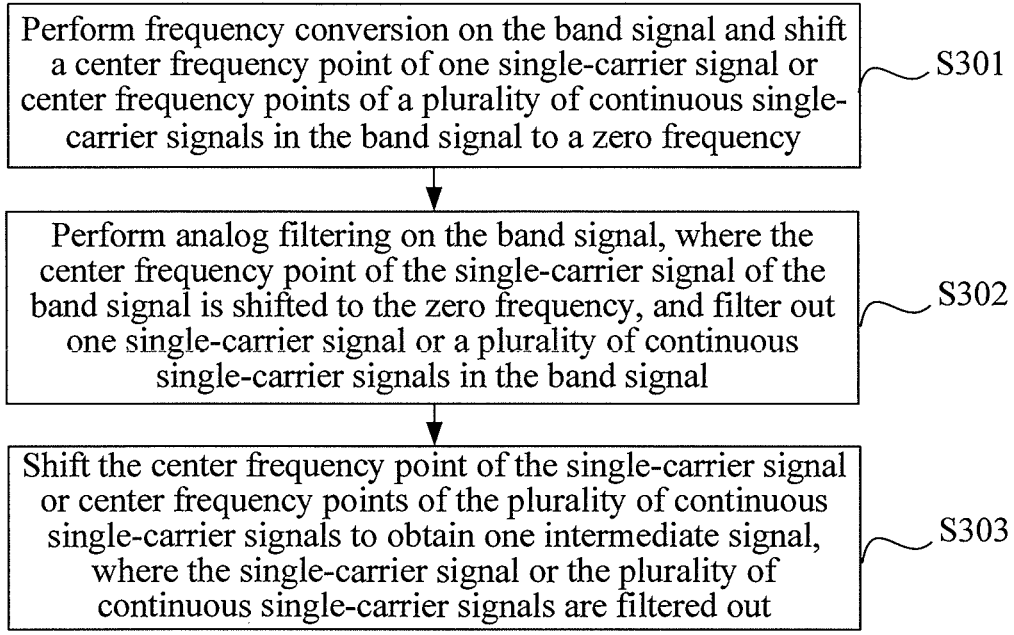
FIG. 9 is a schematic flow chart of an analog extracting step provided by an embodiment of the present invention.

In the embodiment of the present invention, as shown in FIG. 9, this step may include the following steps.

S301: Perform frequency conversion on a band signal and shift the center frequency point of one single-carrier signal or the center frequency points of a plurality of continuous single-carrier signals in the band signal to the zero frequency.

In this step, the center frequency point of one single-carrier signal or the center frequency points of a plurality of continuous single-carrier signals, where the one single-carrier signal or the plurality of continuous single-carrier signals need to be filtered out, are shifted to the zero frequency for the convenience of the subsequent filtering performed on the single-carrier signal.

S302: Perform analog filtering on the band signal, where the center frequency point of the single-carrier signal of the band signal is shifted to the zero frequency, and filter out one single-carrier signal or a plurality of continuous single-carrier signals in the band signal.

S303: Shift the center frequency point of the single-carrier signal or the center frequency points of the plurality of continuous single-carrier signals to obtain one intermediate signal, where the single-carrier signal or the plurality of continuous single-carrier signals are filtered out.

The bands of the L intermediate signals obtained in step S300 are different and continuous, and because each intermediate signal can include one single-carrier signal or can include a plurality of continuous single-carrier signals, L is larger than or equal to M and is less than or equal to N, and L is also a positive integer.

S400: Combine the L intermediate signals in accordance with a manner of adding bandwidth together to obtain one analog signal with continuous bands.

S500: Perform analog-to-digital conversion on the analog signal obtained after the combination to obtain one digital signal.

S600: Perform frequency conversion and digital filtering on the digital signal to obtain N single-carrier digital signals which are in one-to-one correspondence with the N single-carrier signals included in the multi-carrier signal.

Figure 10:
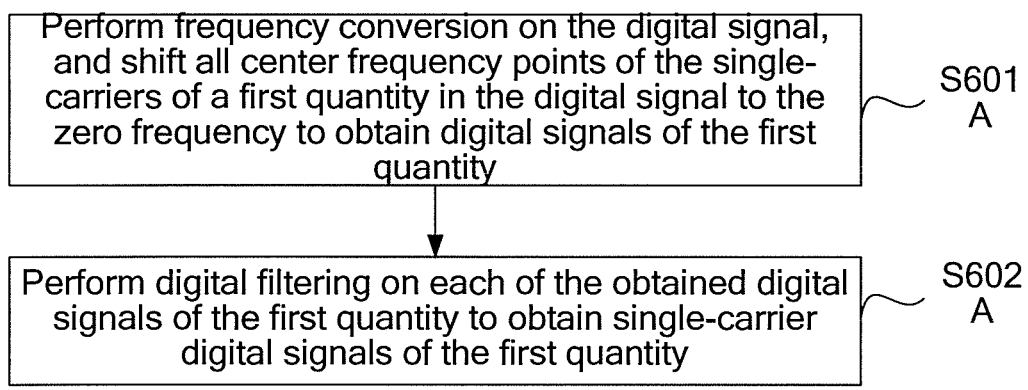
FIG. 10 is a schematic flow chart of a digital extracting step provided by an embodiment of the present invention.

In the embodiment of the present invention, as shown in FIG. 10, this step may include the following steps.

S601A: Perform frequency conversion on the digital signal, and shift all the center frequency points of the N single-carriers in the digital signal to the zero frequency to obtain N digital signals.

In the N digital signals obtained after the frequency conversion, the center frequency points of the single-carriers are all located at the zero frequency.

S602A: Perform digital filtering on each of the obtained N digital signals to obtain N single-carrier digital signals.

The N single-carrier digital signals obtained after the digital filtering are in one-to-one correspondence with the plurality of single-carrier signals in the multi-carrier signal.

Figure 11:
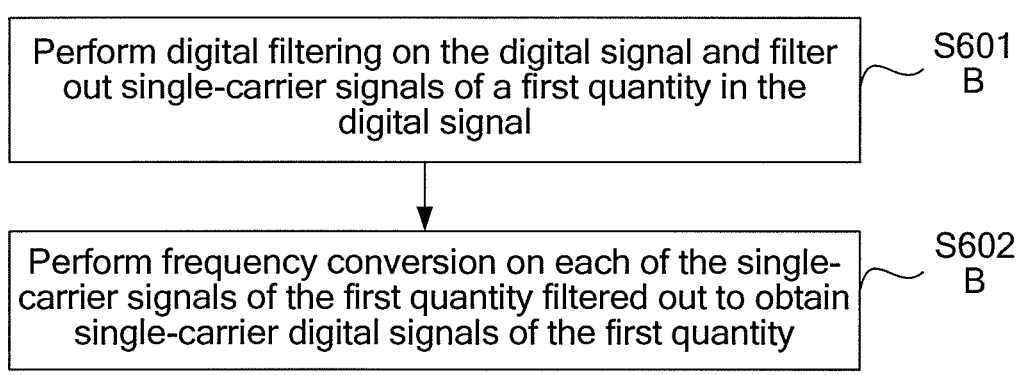
FIG. 11 is another schematic flow chart of a digital extracting step provided by an embodiment of the present invention.

In S600, firstly the frequency conversion and then the digital filtering can be performed on the digital signal; alternatively, firstly the digital filtering and then the frequency conversion can be performed on the digital signal. As shown in FIG. 11, this step can further include the following.

S601B: Perform digital filtering on the digital signal and filter out N single-carrier signals in the digital signal; and S602B: Perform frequency conversion on each of the N single-carrier signals filtered out to obtain N single-carrier digital signals.

The frequency conversion means that a center frequency point of each of the N single-carrier signals is shifted to the zero frequency, and the N single-carrier digital signals obtained after the frequency conversion are in one-to-one correspondence with the plurality of single-carrier signals in the multi-carrier signal.

The steps in FIG. 10 are to perform the frequency conversion firstly and then perform the digital filtering, while the steps in FIG. 11 are to perform the digital filtering firstly and then perform the frequency conversion. At the time of processing the digital signal obtained after the analog-to-digital conversion, the steps in FIG. 11 are to perform the digital filtering firstly and then perform the frequency conversion on the single-carrier signal obtained after the filtering, so for comparison between the steps in FIG. 10 and the steps in FIG. 11, when the frequency conversion is performed, the center frequency point in FIG. 10 needs to be shifted to a position different from a position to which the center frequency point in FIG. 11 is shifted.

Only exemplary embodiments of the present invention are described above, which enable persons skilled in the art to understand or implement the present invention. Various modifications made to the embodiments are apparent to persons skilled in the art, and general principles defined in the specification may be implemented in other embodiments without departing from the idea or scope of the present invention. Therefore, the present invention will not be limited to the embodiments described in the document but extends to the widest scope that complies with the principle and novelty disclosed in the document.

What is claimed is:

1. A multi-carrier receiving device, comprising an antenna, a splitting module, a combiner, an analog-to-digital converter, M analog extraction modules, and N digital extraction modules, wherein M is an integer larger than 2, and N is an integer larger than or equal to M;
   the antenna is configured to receive a multi-carrier signal, and the multi-carrier signal comprises N single-carrier signals;
   the splitting module is configured to split the multi-carrier signal into a plurality of band signals in accordance with different bands, wherein any one of the band signals comprises one single-carrier signal, or a plurality of discrete single-carrier signals, or a plurality of continuous single-carrier signals, and the number of the plurality of band signals is less than or equal to M;
   the M analog extraction modules are configured to perform frequency conversion and analog filtering on the plurality of band signals to obtain L intermediate signals, wherein one band signal corresponds to at least one analog extraction module, bands of the L intermediate signals are different and continuous, and M≤L≤N;
   the combiner is configured to combine the L intermediate signals into one analog signal in accordance with a manner of adding bandwidth together;
   the analog-to-digital converter is configured to perform analog-to-digital conversion on the analog signal obtained after the combination to obtain one digital signal; and
   the N digital extraction modules are configured to extract N single-carrier digital signals which are in one-to-one correspondence with the N single-carrier signals comprised in the multi-carrier signal from the digital signal.

2. The multi-carrier receiving device according to claim 1, wherein the splitting module comprises a splitter and a plurality of first frequency converters, wherein
   the splitter is configured to split the multi-carrier signal into a plurality of split signals in accordance with different bands; and
   the number of the first frequency converters is equal to the number of the split signals, wherein any one of the first frequency converters is configured to perform frequency conversion on one of the split signals and shift a center frequency point of the split signal to a zero frequency to obtain a band signal whose center frequency point is located at the zero frequency.

3. The multi-carrier receiving device according to claim 2, wherein one of the analog extraction module comprises:
   a second frequency converter, an analog filter, and at least one third frequency converter, wherein
   the second frequency converters are in one-to-one correspondence with the first frequency converters, and the second frequency converters each are configured to shift a center frequency point of one or more continuous single-carrier signals in the band signal to the zero frequency;
   the analog filter is configured to perform analog filtering on the band signal, wherein a center frequency point of a single-carrier signal of the band signal is shifted to the zero frequency, and filter out the one or more continuous single-carrier signals in the band signal; and
   the at least one third frequency converter is configured to shift the center frequency point of the one or more continuous single-carrier signals filtered out to obtain one intermediate signal.

4. The multi-carrier receiving device according to claim 1, wherein bandwidth of the analog-to-digital converter is larger than or equal to a sum of bandwidth of all analog filters in the M analog extraction modules.

5. The multi-carrier receiving device according to claim 4, wherein one of the digital extraction module comprises a fourth frequency converter and a digital filter, wherein
   the fourth frequency converter is configured to perform frequency conversion on the digital signal obtained after the analog-to-digital conversion, and shift a center frequency point of one single-carrier signal in the digital signal to the zero frequency; and
   the digital filter is configured to filter out the single-carrier signal whose center frequency point is located at the zero frequency in the digital signal, to obtain one single-carrier digital signal corresponding to one single-carrier signal in the multi-carrier signal.

6. The multi-carrier receiving device according to claim 4, wherein one of the digital extraction module comprises a digital filter and a fourth frequency converter, wherein
   the digital filter is configured to filter out one single-carrier signal in the digital signal obtained after the analog-to-digital conversion; and
   the fourth frequency converter is configured to shift a center frequency point of the single-carrier signal filtered out to the zero frequency to obtain one single-carrier digital signal corresponding to one single-carrier signal in the multi-carrier signal.

7. A multi-carrier receiving method, comprising:
   receiving a multi-carrier signal, wherein the multi-carrier signal comprises N single-carrier signals;
   splitting the received multi-carrier signal into a plurality of band signals in accordance with different bands, wherein any one of the band signals comprises one single-carrier signal, or a plurality of discrete single-carrier signals, or a plurality of continuous single-carrier signals;

performing frequency conversion and analog filtering on the plurality of band signals to obtain L intermediate signals, wherein bands of the L intermediate signals are different and continuous, and L is less than or equal to N;

combining the L intermediate signals in accordance with a manner of adding bandwidth together to obtain one analog signal with continuous bands;

performing analog-to-digital conversion on the analog signal obtained after the combination to obtain one digital signal; and performing frequency conversion and digital filtering on the digital signal to obtain N single-carrier digital signals which are in one-to-one correspondence with the N single-carrier signals comprised in the multi-carrier signal.

8. The method according to claim 7, wherein the splitting the received multi-carrier signal into a plurality of band signals in accordance with different bands comprises:

splitting the multi-carrier signal into a plurality of split signals in accordance with different bands, wherein the number of the split signals is less than or equal to M, M is an integer larger than 2, and M is an integer less than or equal to N; and performing frequency conversion on the plurality of split signals and shifting center frequency points of the plurality of split signals to a zero frequency to obtain a plurality of band signals whose center frequency points are located at the zero frequency.

9. The method according to claim 8, wherein, when one of the band signal comprises one single-carrier signal or a plurality of discrete single-carrier signals, the performing frequency conversion and analog filtering on the plurality of band signals to obtain L intermediate signals comprises specifically:

performing frequency conversion on the band signal and shifting a center frequency point of the one single-carrier signal or center frequency points of the plurality of single-carrier signals in the band signal to the zero frequency;

performing analog filtering on the band signal, wherein the center frequency point of the single-carrier signal of the band signal is shifted to the zero frequency, and filtering out the one single-carrier signal or the plurality of continuous single-carrier signals in the band signal; and shifting the center frequency point of the single-carrier signal or the center frequency points of the plurality of continuous single-carrier signals, where the single-carrier signal or the plurality of continuous single-carrier signals are filtered out, to obtain one intermediate signal, wherein the bands of the L intermediate signals are different and continuous, and $M \leq L \leq N$.

10. The method according to any one of claim 9, wherein the performing frequency conversion and digital filtering on the digital signal comprises specifically:

performing frequency conversion on the digital signal, shifting all center frequency points of N single-carriers signals in the digital signal to the zero frequency to obtain N digital signals, wherein center frequency points of the single-carriers signals of the N digital signals are located at the zero frequency; and performing digital filtering on the obtained N digital signals, wherein the center frequency points of the single-carriers signals of the obtained N digital signals are located at the zero frequency, to obtain N single-carrier digital signals which are in one-to-one correspondence with the plurality of single-carrier signals in the multi-carrier signal.

11. The method according to any one of claim 9, wherein the performing frequency conversion and digital filtering on the digital signal comprises specifically:

performing digital filtering on the digital signal, and filtering out N single-carrier signals in the digital signal; and performing frequency conversion on each of the N single-carrier signals filtered out, and shifting a center frequency point of each of the N single-carrier signals to the zero frequency to obtain N single-carrier digital signals which are in one-to-one correspondence with the plurality of single-carrier signals in the multi-carrier signal.

* * * * *